US009646214B2

(12) United States Patent
Maeda et al.

(10) Patent No.: US 9,646,214 B2
(45) Date of Patent: May 9, 2017

(54) LANE BOUNDARY LINE RECOGNITION DEVICE AND COMPUTER-READABLE STORAGE MEDIUM STORING PROGRAM OF RECOGNIZING LANE BOUNDARY LINES ON ROADWAY

(71) Applicant: DENSO CORPORATION, Kariya, Aichi-pref. (JP)

(72) Inventors: Yuu Maeda, Ichinomiya (JP); Naoki Kawasaki, Kariya (JP); Syunya Kumano, Gothenburg (SE); Shunsuke Suzuki, Aichi-ken (JP); Tetsuya Takafuji, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/790,444

(22) Filed: Jul. 2, 2015

(65) Prior Publication Data
US 2016/0012298 A1    Jan. 14, 2016

(30) Foreign Application Priority Data
Jul. 11, 2014  (JP) ................. 2014-142961

(51) Int. Cl.
*G06K 9/00* (2006.01)
*G06K 9/46* (2006.01)
(Continued)

(52) U.S. Cl.
CPC ....... *G06K 9/00798* (2013.01); *G06K 9/4604* (2013.01); *G06K 9/52* (2013.01);
(Continued)

(58) Field of Classification Search
USPC ....... 382/100, 103–108, 151, 155, 162, 168, 382/172, 173, 181, 190–199, 209, 219,
(Continued)

(56) References Cited

U.S. PATENT DOCUMENTS 7,894,632 B2 *  2/2011  Park ................. G06K 9/00798
                                                    382/104
2005/0270374 A1 * 12/2005 Nishida ............. G05D 1/0246
                                                    348/148
(Continued)

FOREIGN PATENT DOCUMENTS

JP      2005-346383      12/2005
JP      2006-331389      12/2006
(Continued)

*Primary Examiner* — Seyed Azarian
(74) *Attorney, Agent, or Firm* — Knobbe, Martens, Olson & Bear, LLP

(57) ABSTRACT

An in-vehicle camera obtains image frames of a scene surrounding an own vehicle on a roadway. An extracting section in a lane boundary line recognition device extracts white line candidates from the image frames. The white line candidates indicate a degree of probability of white lines on an own vehicle lane on the roadway and a white line of a branch road which branches from the roadway. A branch judgment section calculates a likelihood of the white line as the white line of the branch road, and judges whether or not the white line candidate is the white line of the branch road based on the calculated likelihood. The branch judgment section decreases the calculated likelihood when a recognizable distance of the lane boundary line candidate monotonically decreases in a predetermined number of the image frames.

8 Claims, 5 Drawing Sheets

(51) Int. Cl.
  *G06K 9/52*   (2006.01)
  *G06T 7/20*   (2017.01)
  *G06T 7/60*   (2017.01)
  *G06T 7/00*   (2017.01)
  *G06F 19/00*  (2011.01)

(52) U.S. Cl.
  CPC .............. *G06T 7/0085* (2013.01); *G06T 7/20* (2013.01); *G06T 7/60* (2013.01); *G06K 2009/4666* (2013.01); *G06T 2207/30256* (2013.01)

(58) Field of Classification Search
  USPC ....... 382/232, 254, 266, 274, 276, 287–291, 382/305, 312; 348/148; 701/117
  See application file for complete search history.

(56) References Cited

U.S. PATENT DOCUMENTS

| | | | |
|---|---|---|---|
| 2006/0239509 A1* | 10/2006 | Saito | G06K 9/6205 382/104 |
| 2009/0157286 A1* | 6/2009 | Saito | B60W 30/16 701/117 |
| 2015/0248763 A1 | 9/2015 | Kumano et al. | |

FOREIGN PATENT DOCUMENTS

| | | |
|---|---|---|
| JP | 2007-164636 | 6/2007 |
| JP | 2015-166903 A | 9/2015 |

* cited by examiner

VIEW OF ROAD
JUNCTION IN U.S.A.

FARTHEST
RECOGNIZABLE END
POINT OF WHITE LINE
CANDIDATE

FARTHEST
RECOGNIZABLE END
POINT OF WHITE LINE
CANDIDATE

VIEW OF BRANCH ROAD IN JAPAN

RECOGNIZABLE DISTANCE L
OF WHITE LINE CANDIDATE
(AT RIGHT SIDE OF OWN
VEHICLE LANE)

JUDGMENT OF RECOGNIZING
PRESENCE OF BRANCH ROAD

CURVATURE $\rho$ (1/m) OF
WHITE LINE CANDIDATE
(AT RIGHT SIDE OF OWN
VEHICLE LANE)

JUDGMENT OF RECOGNIZING
PRESENCE OF BRANCH ROAD

JUDGMENT OF RECOGNIZING NO BRANCH RAOD

RECOGNIZED PAIR OF WHITE
LINE CANDIDATES

JUDGMENT OF RECOGNIZING BRANCH ROAD

RECOGNIZED WHITE LINE
CANDIDATE

LANE BOUNDARY LINE RECOGNITION DEVICE AND COMPUTER-READABLE STORAGE MEDIUM STORING PROGRAM OF RECOGNIZING LANE BOUNDARY LINES ON ROADWAY

CROSS-REFERENCE TO RELATED APPLICATION

This application is related to and claims priority from Japanese Patent Application No. 2014-142961 filed on Jul. 11, 2014, the contents of which are hereby incorporated by reference.

BACKGROUND OF THE INVENTION

1. Field of the Invention

The present invention relates to lane boundary line recognition devices and computer-readable storage mediums for storing programs capable of recognizing lane boundary lines on a roadway on which an own vehicle drives, and assisting a driver of the own vehicle in order to perform driving safely.

2. Description of the Related Art

There has been proposed a driver assist technology capable of recognizing lane boundary lines on a roadway, on which an own vehicle drives, on the basis of images obtained by one or more in-vehicle cameras mounted on the own vehicle, and performing the driver assist of the own vehicle on the basis of the recognized lane boundary lines. The driver assist technology often provides warning regarding occurrence of abnormalities to the driver of the own vehicle, for example when the own vehicle departs from the own vehicle lane on the roadway on which the own vehicle drives. In order to provide the driver assist technology previously described, it is necessary to correctly detect and recognize the lane boundary lines of the own vehicle lane on the roadway, the presence of a branch road and a junction in front of the own vehicle. The branch road branches from the roadway on which the own vehicle drives. In general, the surface of the roadway is divided into one or more lanes such as vehicle lanes, a bike lane, a parking lane, and a sidewalk by using lane boundary lines, i.e. solid white lines, dotted white lines, etc. In order to provide the driver assist, there has been proposed a device capable of correctly detecting and recognizing the presence of a branch road, which branches from the roadway ahead the own vehicle.

For example, a patent document, Japanese patent laid open publication No. 2006-331389 discloses a lane boundary line recognition device capable of searching a surrounding area of previously-detected lane boundary lines, and detecting lane boundary lines on the roadway in currently-obtained image relating to the surrounding area. When a lane width between the detected lane boundary lines at both sides (the right side and the left side) of the own vehicle lane is out of a predetermined range, the lane boundary line recognition device determines that the lane boundary line candidate having a low parallel degree is a lane boundary line of a branch road which branches from the roadway ahead the own vehicle. By the way, the parallel degree is obtained by comparing an estimated travel route of the own vehicle with each of the detected lane boundary lines.

However, for the device disclosed in the patent document 1 previously described, it is necessary to calculate such a parallel degree between the estimated travel route of the own vehicle and each of the lane boundary lines, and detect the presence of a branch road on the basis of the calculated parallel degree. In other words, the device disclosed in the patent document 1 correctly judges the presence of a branch road only when a road width between the lane boundary lines of the roadway gently increases to meet the branch road.

On the other hand, it is difficult for the device disclosed in the patent document 1 to correctly recognize the presence of a branch road when a road width of the roadway suddenly expands at a junction in North America and Japan, and a junction point of a branch road in an urban area in Japan. This would cause a possible problem of it being difficult to correctly detect the presence of a branch road because the device often misses the lane boundary line which belongs to the branch road.

SUMMARY

It is therefore desired to provide a lane boundary line recognition device and a computer-readable storage mediums for storing a program for causing a computer system to execute functions of the lane boundary line recognition device. The lane boundary recognition device and the program stored in the computer-readable storage medium are capable of correctly detecting lane boundary lines and recognizing the presence of a branch road with high accuracy even if such a branch road suddenly branches at a wide angle from a roadway (or an own vehicle lane on the roadway) on which an own vehicle drives.

An exemplary embodiment provides a lane boundary line recognition device. The lane boundary line recognition device has a detection section and a branch judgment section. An in-vehicle camera is mounted on the own vehicle and captures image frames surrounding an own vehicle on a roadway on which the own vehicle drives. The detection section detects lane boundary line candidates in the image frame of the surrounding area of the own vehicle. The detected lane boundary line candidates are candidates of lane boundary lines on the roadway on which the own vehicle drives. The branch judgment section calculates a likelihood of each of the lane boundary line candidates, which indicates a degree whether the lane boundary line candidate detected by the detection section is a lane boundary line of a branch road. The branch road branches from the roadway ahead of the own vehicle. The branch judgment section judges whether or not the lane boundary line candidate detected by the detection section is the lane boundary line of a branch road on the basis of the calculated likelihood. In particular, the branch judgment section increases the likelihood of the lane boundary line candidate when a recognizable distance of the lane boundary line candidate monotonically decreases in a predetermined number of the image frames. This recognizable distance indicates a distance to a farthest recognizable end point of the lane boundary line candidate.

The lane boundary line recognition device detects lane boundary line candidates on the roadway on which the own vehicle drives. The lane boundary line recognition device detects a branch road on the basis of image frames of a surrounding area of the own vehicle captured by the in-vehicle camera. The lane boundary line recognition device calculates a likelihood of each of the lane boundary line candidates. The likelihood indicates a degree of a lane boundary line being of a branch road. The lane boundary line recognition device judges whether or not the lane boundary line candidate is a lane boundary line of the branch road on the basis of the calculated likelihood. In particular, the lane boundary line recognition device increases the likelihood of the lane boundary line candidate when the recognizable distance monotonically decreases in the predetermined number of the image frames. The recognizable distance is defined as a distance from the own vehicle to a farthest recognizable end point of the lane boundary line candidate.

For example, when a branch road branches from the roadway, in front of the own vehicle, on which the own vehicle drives, the recognizable distance of the lane boundary line candidate belonging to the branch road decreases as the own vehicle more approaches the branch road so long as the branch road branches at a sharp angle or a wide angle from the roadway. Accordingly, when using a change of the recognizable distance of the lane boundary line through the predetermined number of image frames, it is possible for the lane boundary line recognition device to quickly judge whether or not the lane boundary line belongs to the branch road in front of the own vehicle with high accuracy at an earlier time as compared with a conventional device. That is, because increasing the likelihood of the lane boundary line of the branch road when the recognizable distance of the lane boundary line candidate monotonically decreases, the lane boundary line recognition device can correctly and speedily judge the presence of the branch road in front of the own vehicle with high accuracy even if a road width of the lane boundary line candidates suddenly increases at a branch point, i.e. the branch road branches at a wide angle from the roadway.

In accordance with another aspect of the present invention, there is provided a lane boundary line recognition device having another specific structure. That is, the lane boundary line recognition device has a detection section and a branch judgment section. The detection section detects lane boundary candidates which indicate candidates of lane boundary lines on a roadway on which an own vehicle drives on the basis of image frames of surrounding image of the roadway. The image frames are image of the surrounding area of the own vehicle captured by an in-vehicle camera mounted on the own vehicle. The branch judgment section calculates a likelihood which indicates a degree whether the lane boundary line candidate detected by the detection section belongs to a branch road. The roadway meets the branch road ahead the own vehicle. The branch judgment section judges whether or not each of the lane boundary line candidates detected by the detection section belongs to the branch road on the basis of the calculated likelihood. In particular, the branch judgment section increases the likelihood of the lane boundary line candidate when a curvature of the lane boundary line candidate monotonically varies in the predetermined number of the image frames.

The lane boundary line recognition device uses a curvature of the lane boundary line candidate which varies through the predetermined number of the image frames, instead of using the change of the recognizable distance of the lane boundary line candidate. When there is a branch road in front of the won vehicle, i.e. a branch road branches from the driveway ahead the own vehicle, the curvature of the lane boundary line candidate monotonically varies in the predetermined number of the image frames so long as the branch road branches at a sharp angle or a wide angle from the roadway. It is therefore possible for the lane boundary line recognition device to correctly recognize the presence of the branch road on the roadway ahead the own vehicle at an earlier time on the basis of the change of a curvature of the lane boundary line candidate monotonically varies in the predetermined number of the image frames.

It is possible for the lane boundary line recognition device to correctly judge the presence of the branch road with high accuracy by increasing the likelihood of the lane boundary line candidate of the branch road when the curvature of the lane boundary line candidate monotonically varies in the predetermined number of the image frames even if a road width of the lane boundary line candidates suddenly increases at a branch point, i.e. the branch road branches at a wide angle from the roadway.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
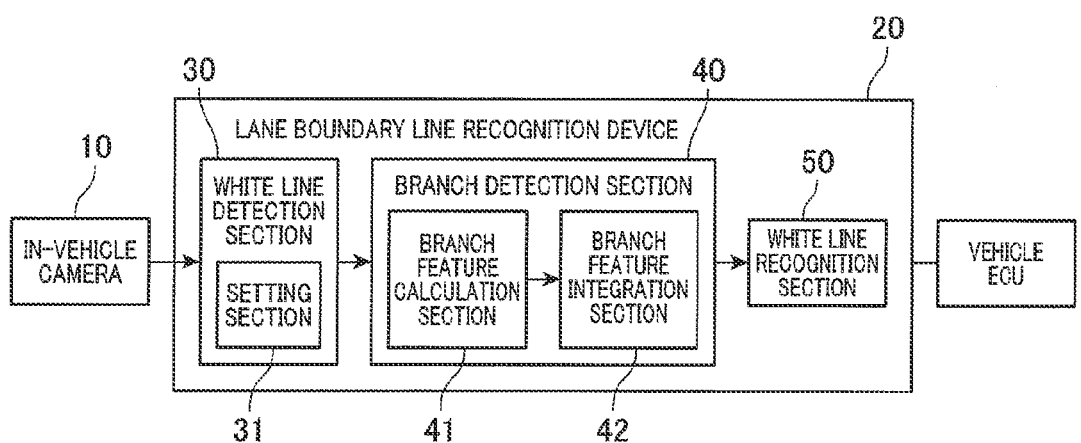
FIG. 1 is a block diagram showing a structure of a lane boundary line recognition device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a lane boundary line recognition device 20 according to an exemplary embodiment with reference to FIG. 1 to FIG. 9.

FIG. 1 is a block diagram showing a structure of the lane boundary line recognition device 20 according to the exemplary embodiment. The lane boundary line recognition device 20 according to the exemplary embodiment recognizes lane boundary lines on a roadway on which an own vehicle 70 drives. The recognized lane boundary lines are used for a drive assist such as a lane keeping assist control (LKA control) and a lane departure warning.

A description will now be given of the structure of the lane boundary line recognition device 20 according to the exemplary embodiment with reference to FIG. 1. The own vehicle 70 is equipped with the lane boundary line recognition device 20 according to the exemplary embodiment and the in-vehicle camera 10. The lane boundary line recognition device 20 receives image captured by and transmitted from the in-vehicle camera 10 mounted on the own vehicle 70. The lane boundary line recognition device 20 recognizes white lines (lane boundary lines as roadway markings) on the driveway.

The in-vehicle camera 10 is composed of at least one of a CCD (charge coupled device) camera, a CMOS (complementary Metal oxide Semiconductor) sensor, a near infrared camera, etc.

Figure 2:
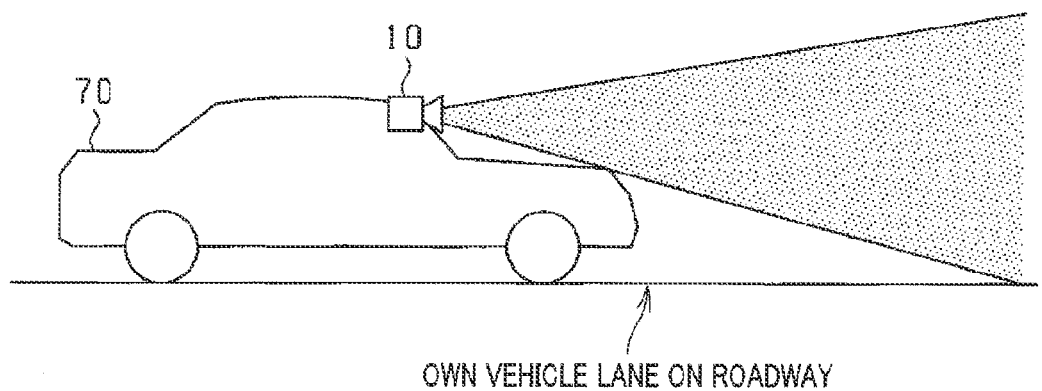
FIG. 2 is a side view showing an in-vehicle camera mounted on an own vehicle capable of capturing image of a surrounding area of the own vehicle.

FIG. 2 is a side view showing the in-vehicle camera 10 mounted on the own vehicle 70. The in-vehicle camera 10 captures image of a surrounding area of the own vehicle 70. In more detail, for example, the in-vehicle camera 10 is arranged near at upper side of a windshield of the own vehicle 70. The in-vehicle camera 10 captures image frames of a scene in front of the own vehicle 70 having a predetermined angle range. For example, the in-vehicle camera 10 captures the number of image frames per second. It is acceptable to use stereo cameras or a plurality of cameras in order to form the in-vehicle camera 10.

The lane boundary line recognition device 20 according to the exemplary embodiment is a computer system equipped with a central processing unit (CPU), a memory storage section such as a random access memory (RAM), a read only memory (ROM), etc., and an input/output (I/O) interface, etc. For example, the ROM as a computer-readable storage medium stores one or more programs for causing a central processing unit in a computer system to execute functions of the lane boundary line recognition device 20. That is, the CPU in the computer system reads and performs a program stored in the ROM, and executes the program which corresponds to the functions of the lane boundary recognition device such as a white line detection section 30 (or a detection section 30), a branch judgment section 40, and a white line recognition section 50 (or a recognition section 50). It is also possible for another type of the computer-readable storage medium, instead of using the ROM, to store this program. In this case, the computer system reads and executes the program stored in the memory storage medium, and performs the program to execute the functions of the lane boundary line recognition device 20.

That is, it is possible to realize the function of the lane boundary line recognition device 20 according to the exemplary embodiment by using the program stored in the computer-readable storage medium.

The white line detection section 30 has a setting section 31. The white line detection section 30 extracts edge points from each of image frames of surrounding the own vehicle 70 captured by the in-vehicle camera 10. The white line detection section 30 further extracts a plurality of pairs of white line candidates (as lane boundary line candidates). When detecting the white line candidates, i.e. detecting edge points of the white line candidates, the setting section 31 generates an extraction region of white line candidates in the image frame around the recognized white line near the own vehicle 70. This reduces processing load of the microcomputer as the lane boundary line recognition device 20 because of generating the extraction region having a minimum necessary region.

The white line detection section 30 selects a pair of the white line candidates having a maximum priority from the plurality of the pairs of the white line candidates. The selected pair of the white line candidates having the maximum priority indicates the white line candidates having a plurality of features regarding white lines (as the lane boundary lines such as solid white lines, dotted white line, etc.) For example, the features of the white lines will have an edge strength which is larger than a predetermined threshold value and a width of the white line which is approximately equal to a predetermined width.

The branch judgment section 40 has a branch feature calculation section 41 and a branch feature integration section 42. The branch judgment section 40 judges whether or not the white line candidate detected by the white line detection section 30 is a white line of a branch road. The branch feature calculation section 41 calculates a likelihood of a white line of the branch road detected by the white line detection section 30.

The more each of the branch features is high, the branch feature calculation section 41 increases the likelihood of the white line candidate as the white line of the branch road. For example, the presence of a branch road is determined:
when the white line candidates at the right side and the left side on the own vehicle lane on the roadway, on which the own vehicle drives, have a low parallel degree;
when a recognizable distance L of the white line candidate monotonically decreases in the predetermined number of image frames; or
when a curvature $\rho$ of the roadway monotonically changes, etc. This recognizable distance L is a distance from the own vehicle to a farthest recognizable end point in a straight line of the white line candidate.

Figure 3:
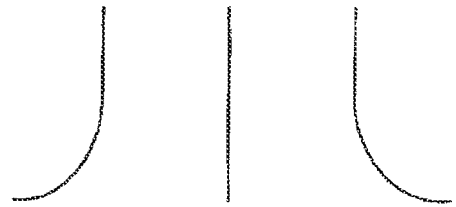
FIG. 3 is a view showing an example when the lane boundary line recognition device according to the exemplary embodiment recognizes a branch road at a junction.
Figure 3:
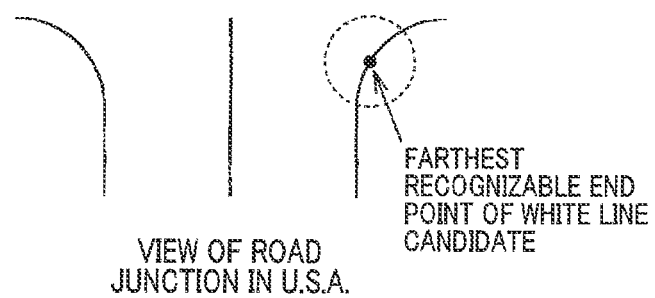
Figure 4:
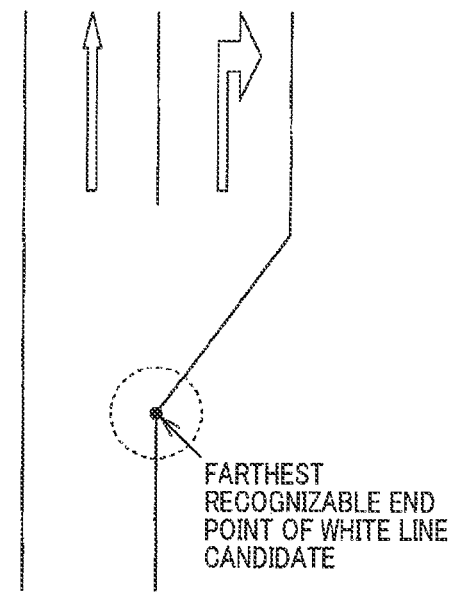
FIG. 4 is a view showing another example when the lane boundary line recognition device according to the exemplary embodiment recognizes another branch road.

FIG. 3 is a view showing an example when the lane boundary line recognition device 20 according to the exemplary embodiment recognizes a branch road at a junction. FIG. 4 is a view showing another example when the lane boundary line recognition device 20 according to the exemplary embodiment recognizes another branch road.

FIG. 3 shows a case in which a width of the roadway (or the own vehicle lane of the roadway), on which the own vehicle drives, suddenly increases at a junction at which a branch road branches from the own vehicle lane on the roadway. FIG. 4 shows a case in which a width of the own vehicle lane on the roadway suddenly increases at a point from which the branch road branches from the own vehicle lane. In FIG. 3 and FIG. 4, the width of the own vehicle lane indicates a distance between the white lines at the right side and the left side of the own vehicle lane on the roadway.

When the branch road branches at a branch point from the own vehicle lane in front of the own vehicle 70, and the own vehicle 70 approaches the branch point on the own vehicle lane, the recognizable distance L of the white line candidate becomes short, i.e. monotonically decreases so long as the branch road branches at a sharp angle or a wide angle from the roadway at the branch point.

The setting section 31 determines an extraction region of the white line candidates in the image frames on the basis of at least one of a change of the recognizable distance L and a change of the curvature $\rho$. In more detail, the setting section 31 expands the extraction region in a lateral direction in order to extract a white line of the branch road when the recognizable distance L obtained immediately before the present time monotonically decreases or the curvature ρ of the white line candidate monotonically changes because it is a high possibility that the branch road branches from the own vehicle lane in front of the own vehicle 70.

This makes it possible to avoid white line candidates belonging to branch roads from being eliminated from the extraction region while decreasing the processing load by using the extraction region having a minimum necessary region even if the branch road suddenly branches from the own vehicle lane at a wide angle.

The branch feature integration section 42 integrates the likelihoods, calculated by the branch feature calculation section 41, which corresponds to the features of the branch road. The branch feature integration section 42 calculates an integrated branch likelihood X of the branch road. The calculated integrated likelihood of the branch road indicates a confidence degree of the white line of the branch road, i.e. a confidence degree whether or not the white line candidate is the white line of the branch road. In more detail, the branch feature integration section 42 calculates the integrated branch likelihood X (i.e. integrated branch probability) by using an equation of $X=A \cdot B/[A \cdot B+(1-A) \cdot (1-B)]$ when integrating the branch likelihoods A and B. Each of the branch likelihood A, the branch likelihood B and the integrated branch likelihood X is within a range of 0 to 1.

In order to further integrate a branch likelihood C with the integrated branch likelihood X, the integrated branch likelihood X, which has been obtained by the equation previously described using the branch likelihood A and the branch likelihood B, is inserted into the branch likelihood A as a variable, and a new integrated branch likelihood X of the branch likelihoods A, B and C is calculated by using the equation previously described. That is, it is possible to sequentially calculate the final integrated branch likelihood X when not less than three likelihoods are integrated. The branch judgment section 40 judges whether or not the white line candidate is the white line of the branch road on the basis of the integrated branch likelihood X calculated by the branch feature integration section 42.

The white line recognition section 50 removes the white line candidate, which has been judged as the white line of the branch road by the branch judgment section 40, from the white line candidates. This makes it possible to correctly recognize the white lines of the own vehicle lane on the roadway on which the own vehicle 70 drives, and not to recognize the white line of the branch road because the white line of the branch road has been removed, as shown in FIG. 8 and FIG. 9.

Figure 8:
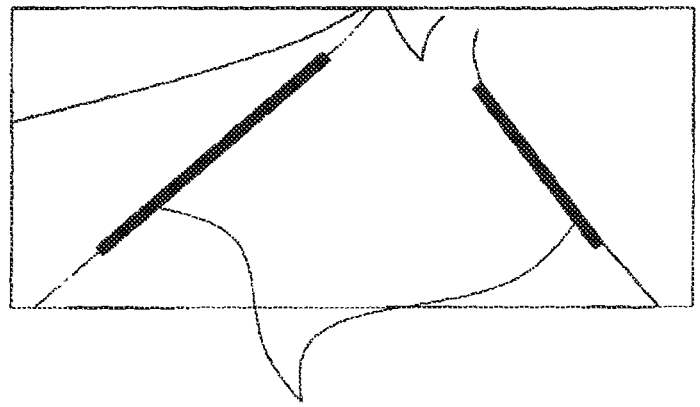
FIG. 8 is a view showing while lane boundary lines recognized by the lane boundary line recognition device according to the exemplary embodiment of the present invention when the lane boundary line recognition device judges that no branch road is present.
Figure 9:
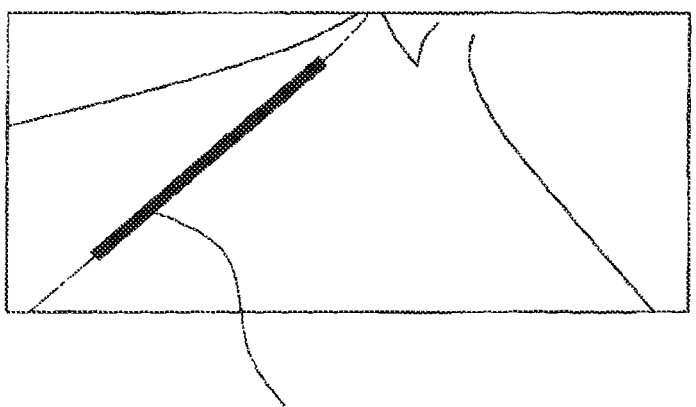
FIG. 9 is a view showing the while lane boundary line recognized by the lane boundary line recognition device according to the exemplary embodiment of the present invention when the lane boundary line recognition device judges the presence of the branch road.

FIG. 8 is a view showing the white lines as the while lane boundary lines recognized by the lane boundary line recognition device 20 according to the exemplary embodiment when the lane boundary line recognition device 20 judges there is no branch road. FIG. 9 is a view showing the while lane boundary line recognized by the lane boundary line recognition device 20 according to the exemplary embodiment when the lane boundary line recognition device 20 judges that the branch road branches from the own vehicle lane, and removes the white line of the branch road from the white line candidates.

Next, a description will now be given of the process of recognizing a white line as a lane boundary line by the lane boundary line recognition device 20 according to the exemplary embodiment with reference to FIG. 5.

Figure 5:
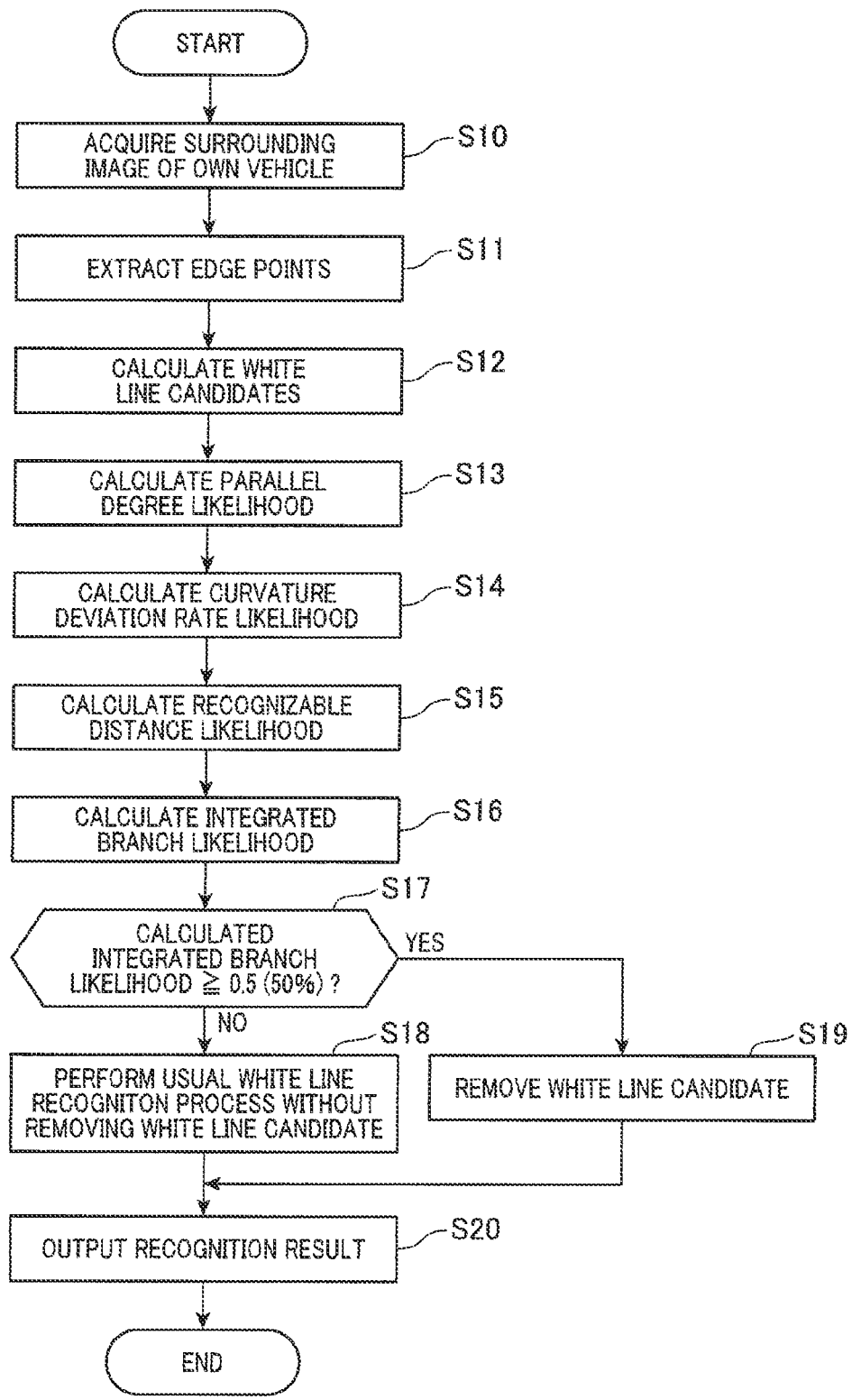
FIG. 5 is a flow chart showing a process of recognizing a white line as a lane boundary line on a roadway, on which the own vehicle drives, according to the exemplary embodiment.

FIG. 5 is a flow chart showing the process of recognizing a white line as a lane boundary line on an own vehicle lane on the roadway on which the own vehicle 70 drives. The lane boundary line recognition device 20 repeatedly performs the process shown in FIG. 5 every image frames.

In step S10, the in-vehicle camera 10 captures image of a surrounding area of the own vehicle 70, which includes image around the own vehicle 70 and in front of the own vehicle 70. The lane boundary line recognition device 20 receives the image transmitted from the in-vehicle camera 10, and converts the received image to planar image viewed from a top of the roadway. The operation flow goes to step S11.

In step S11, the lane boundary line recognition device 20 extracts edge points having a large brightness change rate in a horizontal direction of the image by using a filter such as a Sobel filter. The operation flow goes to step S12.

In step S12, the lane boundary line recognition device 20 performs the Hough transform of the extracted edge points to obtain a plurality of pairs of white line candidates at the right side and the left side of the roadway (or the own vehicle lane) of the own vehicle 70. The lane boundary line recognition device 20 extracts a pair of the white line candidates having a maximum priority of the white line. The operation flow goes to step S13.

In step S13, the lane boundary line recognition device 20 calculates a likelihood of a white line of a branch road on the basis of the selected pair of the white line candidates at the right side and the left side on the own vehicle lane on the roadway, and performs the branch road judgment on the basis of the calculated likelihood of the white line candidates. That is, the lane boundary line recognition device 20 calculates a parallel degree likelihood which is one of the likelihoods to be used for detecting a white line of a branch road.

In more detail, the lane boundary line recognition device 20 calculates a yaw angle θ of each of the white line candidates of the pair at the right side and the left side. A difference between the calculated yaw angles θ indicates a parallel degree of the white line candidates at the right side and the left side. The more the difference is small, the more the parallel degree of the pair of the white line candidates increases. That is, when the difference of the calculated yaw angles θ becomes zero, the white line candidate has a maximum parallel degree. When one of the white line candidates in the pair is a white line of the branch road, these white line candidates of the pair have a low parallel degree. In other words, the more the parallel degree of the white line candidate in the pair at the right side and the left side on the roadway is low, i.e. the more the difference between the yaw angles θ increases, the lane boundary line recognition device 20 increases the parallel degree likelihood. The operation flow goes to step S14.

In step S14, the lane boundary line recognition device 20 calculates a curvature deviation rate likelihood of the white line candidate as one of the likelihoods of the white line of a branch road. In more detail, the lane boundary line recognition device 20 calculates a curvature ρ of each of the white line candidates in the pair at the right side and the left side. When the white line candidate curves at the left side, the curvature ρ of the white line candidate has a positive value. On the other hand, when the white line candidate curves at the right side, the curvature ρ of the white line candidate has a negative value. The lane boundary line recognition device 20 calculates a change rate of the curvature ρ of the white line candidate in a current image frame to a curvature ρ of the white line candidate in a previous image frame, that is, calculates a change rate of the curvature ρ of the white line candidate which corresponds to the curvature deviation rate likelihood.

The lane boundary line recognition device 20 further considers a deviation rate of the curvature ρ of the white line candidate in the predetermined number of image frames immediately before the current image frame.

When a branch road branches from the own vehicle lane at a junction of the roadway on which the own vehicle 70 drives, a radius of the curvature ρ of the white line candidate becomes an infinite value at the junction at which the branch road branches from the roadway. Further, the radius of the curvature of the white line candidate becomes small after passing through the junction. Accordingly, an absolute value of the curvature ρ of the white line candidate calculated on the basis of the white line candidate of the branch road becomes more increasing in the image frame which more approaches the branch road. On the other hand, an absolute value of the curvature ρ of the white line candidate calculated on the basis of the white line candidate of the roadway (as the own vehicle lane on which the own vehicle 70 drives) does not monotonically change in the image frames immediately before the current image frame.

Accordingly, when the absolute value of the curvature ρ of the white line candidate in the predetermined number of image frames monotonically increases, the lane boundary line recognition device 20 according to the exemplary embodiment increases the curvature deviation rate likelihood of the white line candidate in order to increase the integrated branch likelihood X. In more detail, when the absolute value of the curvature ρ of the white line candidate in the predetermined number of the image frames monotonically increases, the lane boundary line recognition device 20 calculates the curvature deviation rate likelihood of the white line candidate so that the integrated branch likelihood X becomes not less than a judgment threshold value. The operation flow goes to step S15.

In step S15, the lane boundary line recognition device 20 calculates a recognizable distance likelihood as one of the likelihoods to determine a white line of a branch road. In more detail, the lane boundary line recognition device 20 calculates a length of a straight part of the white line candidate, i.e. the recognizable length L. This recognizable length L is a distance to the farthest end on the straight line of the white line candidate.

Figure 6:
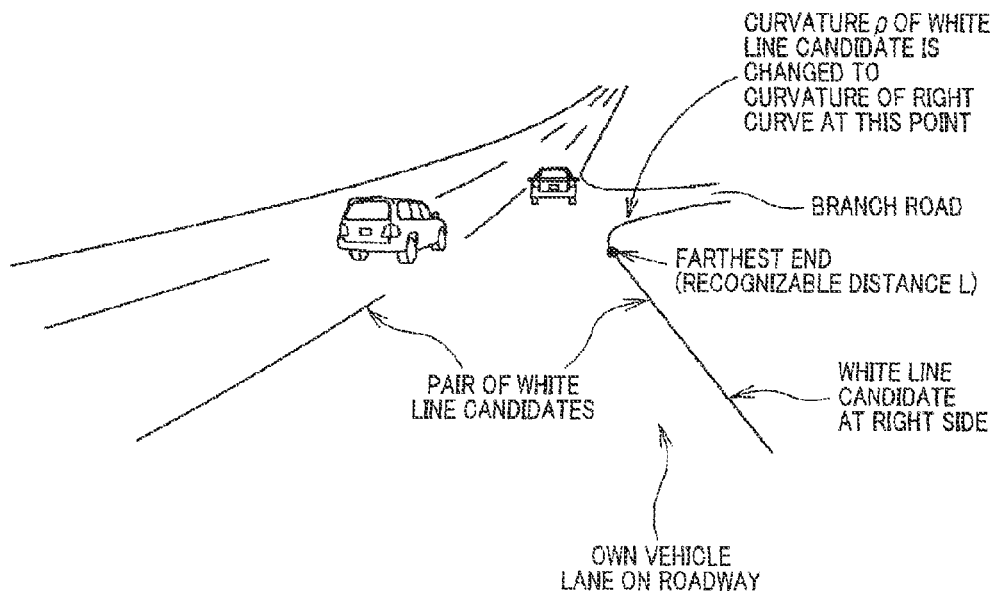
FIG. 6 is a schematic view showing an own vehicle lane on a roadway and a branch road which branches, in front of the own vehicle, from the own vehicle lane on the roadway.

FIG. 6 is a schematic view showing an own vehicle lane on a roadway and a branch road which branches, in front of the own vehicle 70, from the own vehicle lane on the roadway. As shown in FIG. 6, no edge point is extracted at the area which is far from the farthest end on the straight line of the white line candidate designated by the solid line at the right side on the own vehicle lane.

The lane boundary line recognition device 20 detects a change of the recognizable distance L in the predetermined number of the image farmed immediately before the current image frame. When a branch road branches from the own vehicle lane on the roadway, in front of the own vehicle, on which the own vehicle 70 drives, the more the recognizable distance L calculated by using the white line candidate of the branch road becomes short in a plurality of the image frames as the own vehicle more approaches the branch road. On the other hand, the recognizable distance L calculated from the white line candidate of the own vehicle lane on the roadway does not approximately change in the predetermined number of the image farmed immediately before the current image frame when the white line is a solid white line, and increases and decreases when the white line is a dotted white line.

When the recognizable distance L of the white line candidate monotonically decreases in the predetermined number of the image frames, the lane boundary line recognition device 20 calculates the recognizable distance likelihood so as to increase the integrated branch likelihood X which will be calculated later. In more detail, when the recognizable distance L monotonically decreases in the predetermined number of the image frames, the lane boundary line recognition device 20 calculates the recognizable distance likelihood so that the integrated branch likelihood X becomes not less than the judgment threshold value. It is acceptable for the lane boundary line recognition device 20 to use a part of the predetermined number of the previously obtained image frames and the currently obtained image frame. The operation flow goes to step S16.

In step S16, the lane boundary line recognition device 20 calculates the integrated branch likelihood, i.e. integrates the parallel degree likelihood calculated in step S13, the curvature deviation rate likelihood of the white line candidate calculated in step S14 and the recognizable distance likelihood calculated in step S15 to calculate the integrated branch likelihood X. The operation flow goes to step S17.

In step S17, the lane boundary line recognition device 20 further detects whether or not the integrated branch likelihood X calculated in step S16 is not less than 0.5 (50%).

When the detection result in step S17 indicates negation ("NO" in step S17), i.e. the integrated branch likelihood X calculated in step S16 is less than 0.5 (50%), the lane boundary line recognition device 20 judges that the white line candidate is not the white line of the branch road.

On the other hand, when the detection result in step S17 indicates affirmation ("YES" in step S17), i.e. the integrated branch likelihood X calculated in step S16 is not less than 0.5 (50%), the lane boundary line recognition device 20 judges that the white line candidate is the white line of the branch road. It is acceptable for the lane boundary line recognition device 20 to use another value instead of using the value of not less than 0.5 (50%). The operation flow goes to step S18.

In step S18, when the judgment result in step S17 indicates negation ("NO" in step S17), i.e. indicates that the white line candidate is not the white line of the branch road, the lane boundary line recognition device 20 does not remove this white line candidate from the overall white line candidates, and performs the usual white line recognition process. That is, the lane boundary line recognition device 20 judges that the selected white line candidates at the right side and the left side are the white lines of the own vehicle lane on the roadway on which the own vehicle 70 drives. The operation flow goes to step S19.

On the other hand, when the lane boundary line recognition device 20 judges that the white line candidate is the white line of the branch road, the lane boundary line recognition device 20 removes this white line candidate from the overall white line candidates in step S19. That is, when one of the white line candidates in the pair is the white line of the branch road, the lane boundary line recognition device 20 removes the white line candidate corresponding to the white line of the branch road from the overall white line candidates. The operation flow goes to step S20.

In step S20, the lane boundary line recognition device 20 outputs the recognition result of the white lines, i.e. calculated road parameters to a vehicle ECU.

When recognizing the white line candidates in the pair at the right side and the left side on the own vehicle lane of the roadway on which the own vehicle 70 drives, the lane boundary line recognition device 20 outputs, to the vehicle ECU, the road parameters calculated on the basis of the white line candidates in the pair at the right side and the left side of the own vehicle lane.

On the other hand, when recognizing one of the white line candidates as the white line on the own vehicle lane, the lane boundary line recognition device 20 outputs the road parameters calculated on the basis of the one of the white line candidates to the vehicle ECU. The lane boundary line recognition device 20 completes the process shown in FIG. 5.

As previously described, FIG. 6 shows a case in which the branch road is present in front of the own vehicle 70 on the own vehicle lane of the drive road.

Figure 7A:
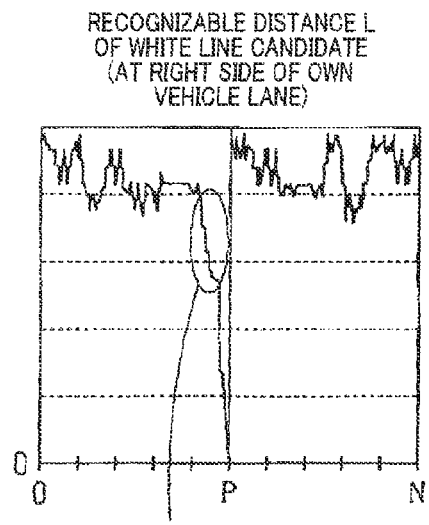
FIG. 7A is a view showing a time change of a recognizable distance L of the white line candidate at the right side of the own vehicle lane on the roadway on which the own vehicle drives and a branch road branches from the own vehicle lane in front of the own vehicle as shown in FIG. 6.
Figure 7B:
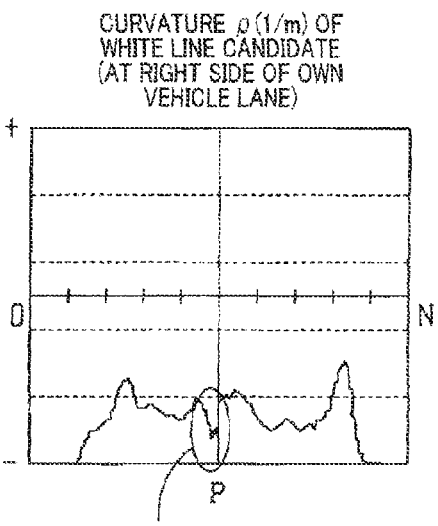
FIG. 7B is a view showing a time change of a curvature $\rho$ of a white line candidate at the right side of the own vehicle lane on the roadway on which the own vehicle drives and the branch road branches from the own vehicle lane in front of the own vehicle as shown in FIG. 6.

FIG. 7A is a view showing a time change of the recognizable distance L of the white line candidate at the right side of the own vehicle lane on the roadway on which the own vehicle 70 drives, and the branch road branches from the own vehicle lane in front of the own vehicle 70 shown in FIG. 6. FIG. 7B is a view showing a time change of the curvature ρ of the white line candidate at the right side of the own vehicle lane on the roadway on which the own vehicle 70 drives and the branch road branches from the own vehicle lane in front of the own vehicle 70 shown in FIG. 6.

In FIG. 7A and FIG. 7B, the horizontal axis indicates a time, and the recognizable distance L of the white line candidate moves from zero to N in the right side, and then moves from N to zero in the left side according to the time elapse. Further, in FIG. 7A and FIG. 7B, a point closest to P at the right side indicates the value calculated on the basis of the oldest image frame, and a point closest to P at the left side indicates the value calculated on the basis of the image frame immediately before the current time. The own vehicle 70 is currently located on the near to the branch road.

As shown in FIG. 7A, the recognizable distance L of the white line candidate monotonically decreases during a period counted from a time just before the current time to the current time. At this time, because the recognizable distance likelihood has a highest value and the integrated branch likelihood becomes not less than 0.5, the lane boundary line recognition device 20 judges that the white line candidate at the right side is a white line of the branch road.

Even if the lane boundary line recognition device 20 misses the white line candidate at the right side when the white line candidate at the right side is outside from the extraction region after the recognizable distance L of the white line candidate monotonically decreases, it is possible for the lane boundary line recognition device 20 to correctly recognize the white line candidate at the right side as the white line of the branch road on the basis of the fact that the recognizable distance L of the white line candidate has monotonically decreased.

In addition, as clearly shown in FIG. 7B, the absolute value of the curvature ρ of the white line candidate monotonically increases during a period counted from a previous time to the current time. At this time, because the curvature deviation rate likelihood of the white line candidate has an increased value, and the integrated branch likelihood becomes not less than 0.5, the lane boundary line recognition device 20 judges that the white line candidate at the right side is the white line of the branch road.

FIG. 8 shows the case in which the lane boundary line recognition device 20 does not judge the presence of the branch road. On the other hand, FIG. 9 shows the case in which the lane boundary line recognition device 20 judges the presence of the branch road.

In the case shown in FIG. 8 in which the lane boundary line recognition device 20 does not judge the presence of the branch road, but the branch road actually branches from the own vehicle lane on the roadway, the lane boundary line recognition device 20 can recognize both the white line of the branch road and the white line of the own vehicle lane on the roadway. In this case, the vehicle ECU performs the drive assist of the own vehicle 70 on the basis of both the white line of the branch road and the white line of the own vehicle lane on the roadway. In this case, the own vehicle 70 drives under the unstable drive assist.

On the other hand, when the lane boundary line recognition device 20 correctly judges the presence of the branch road shown in FIG. 9, even if there is the branch road on the roadway on which the own vehicle 70 drives, the lane boundary line recognition device 20 correctly recognizes the white lines on the own vehicle lane of the roadway only, the vehicle ECU performs the drive assist on the basis of the recognized white lines on the own vehicle lane of the roadway only. This makes it possible for the vehicle ECU to provide a safe drive assist and for the own vehicle 70 to stably drive on the own vehicle lane of the road way.

A description will now be given of the effects of the lane boundary line recognition device 20 according to the exemplary embodiment.

When a branch road branches from the own vehicle lane on the roadway in front of the own vehicle 70, the recognizable distance L of the white line candidate corresponding to the white line of the branch road varies, i.e. decreases as the own vehicle 70 more approaches the branch road so long as the branch road branches at a sharp angle or a wide angle from the own vehicle lane of the roadway. It is possible for the lane boundary line recognition device 20 to correctly judge the presence of the branch road in front of the own vehicle 70 at an early time on the basis of the variation of the recognizable distance L of the white line candidate in the predetermined number of image frames. Accordingly, it is possible for the lane boundary line recognition device 20 to correctly judge the presence of the branch road with high accuracy by increasing the integrated branch likelihood of the white line candidate having the recognizable distance L which gradually decreases even if a road width between the white line candidates on the roadway suddenly increases, i.e. the branch road branches at a wide angle from the own vehicle lane on the roadway.

When a branch road branches from the own vehicle lane on the roadway in front of the own vehicle 70, an absolute value of the curvature ρ of the white line candidate, which indicates the white line of the branch road, monotonically increases as the own vehicle 70 more approaches the branch road so long as the branch road branches at a shallow (sharp) angle or a wide angle from the own vehicle lane of the roadway.

Accordingly, it is possible for the lane boundary line recognition device 20 to correctly judge the presence of the branch road with high accuracy by increasing the integrated branch likelihood of the white line candidate having the curvature ρ, an absolute value of which monotonically increases in the predetermined number of image frames even if a road width between the white line candidates on the roadway suddenly increases, i.e. the branch road branches at a wide angle from the own vehicle lane on the roadway.

It is possible for the lane boundary line recognition device 20 to correctly recognize the white line of the own vehicle lane on the road way on which the own vehicle 70 drives by removing the white line candidate as the white line of the branch road from the overall white line candidates. It is further possible for the vehicle ECU to perform the drive assist on the basis of the recognized white line of the own vehicle lane on the roadway.

When detecting white line candidates, the lane boundary line recognition device 20 determines the extraction region of the white line candidates on the basis of a variation of the recognizable distance L which have been obtained. This makes it possible to suppress the white line candidate of the branch road from deviating from the extraction region even if a branch road branches at a wide angle from the own vehicle lane on the roadway ahead of the own vehicle 70 while decreasing the processing load of the lane boundary line recognition device 20.

When detecting white line candidates, the lane boundary line recognition device 20 determines the extraction region of the white line candidates on the basis of a variation of the curvature ρ of the white line candidate which has been obtained. This makes it possible to suppress the white line candidate of the branch road from deviating from the extraction region even if a branch road branches at a wide angle from the own vehicle lane on the roadway in front of the own vehicle 70 while decreasing the processing load of the lane boundary line recognition device 20.

Other Modifications

It is possible for the lane boundary line recognition device 20 to calculate only the recognizable distance likelihood as one of the likelihoods regarding the white line of the branch road, and judge whether or not the white line candidate is the white line of the branch road by comparing the recognizable distance likelihood with the judgment threshold value.

It is further possible for the lane boundary line recognition device 20 to calculate only the curvature deviation rate likelihood of the white line candidate as one of the likelihoods regarding the white line of the branch road, and judge the white line of a branch road on the basis of a comparison result obtained by comparing the curvature deviation rate likelihood with the judgment threshold value.

It is further possible for the lane boundary line recognition device 20 to calculate integrated branch likelihood by integrating the curvature deviation rate likelihood and the recognizable distance likelihood, without calculating the parallel degree likelihood.

Still further, it is possible for the lane boundary line recognition device 20 to calculate another likelihood of the branch road instead of the parallel degree likelihood, the curvature deviation rate likelihood and the recognizable distance likelihood, and calculate the integrated branch likelihood on the basis of the calculated another likelihood.

It is possible for the lane boundary line recognition device 20 to use a constant region in each image frame from which white line candidates are extracted. It is further possible for the lane boundary line recognition device 20 to determine the extraction region on the basis of other parameters instead of using a time change of the recognizable distance L and a time change of the curvature ρ of the white line candidate.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:
1. A lane boundary line recognition device comprising:
a detection section, using a processor, capable of detecting lane boundary line candidates on a roadway on which an own vehicle drives on the basis of image frames of a surrounding area of the own vehicle on the roadway, captured by an in-vehicle camera mounted on the own vehicle; and
a branch judgment section, using a processor, capable of calculating a likelihood which indicates a degree of whether each of the lane boundary line candidates detected by the detection section is a lane boundary line of a branch road, the branch road branching from the roadway, and
the branch judgment section judging whether or not the lane boundary line candidate detected by the detection section is the lane boundary line of the branch road on the basis of the calculated likelihood, and
the branch judgment section increasing the likelihood of the lane boundary line candidate when a measured length of the lane boundary line candidate monotonically decreases in a predetermined number of the image frames, where the measured length of the lane boundary line candidate is measured from the own vehicle to a farthest recognizable end point of the lane boundary line candidate on each of the image frames.

2. The lane boundary line recognition device according to claim 1, wherein the branch judgment section increases the likelihood of the lane boundary line candidate when a measured curvature of the lane boundary line candidate monotonically varies in the predetermined number of the image frames.

3. The lane boundary line recognition device according to claim 2, the detection section comprises a setting section, using a processor, capable of determining an extraction region in the image frames, from which the lane boundary line candidates are extracted, on the basis of a change of the measured curvature of the lane boundary line candidate when the detection section detects the lane boundary line candidates.

4. The lane boundary line recognition device according to claim 1, further comprising a recognition section, using a processor, capable of recognizing the lane boundary line candidates detected by the detection section belonging to the lane boundary lines, and removing the lane boundary line candidate as the lane boundary line of the branch road determined by the branch judgment section from the lane boundary line candidates.

5. The lane boundary line recognition device according to claim 1, the detection section comprises a setting section, using a processor, capable of determining an extraction region in the image frames, from which the lane boundary line candidates are extracted, on the basis of a change of the measured length of the lane boundary line candidates when the detection section detects the lane boundary line candidates.

6. A non-transitory computer-readable storage medium for storing a program for causing a central processing unit in a computer system to execute the functions of the lane boundary line recognition device according to claim 1.

7. A lane boundary line recognition device comprising:
a detection section, using a processor, capable of detecting lane boundary candidates on a roadway on which an own vehicle drives on the basis of image frames of the roadway, surrounding of the own vehicle, captured by an in-vehicle camera mounted on the own vehicle; and
a branch judgment section, using a processor, capable of calculating a likelihood which indicates a degree whether the lane boundary line candidate detected by the detection section is a lane boundary line of a branch road branches from the roadway, and judging whether or not the lane boundary line candidate detected by the detection section is the lane boundary line of the branch road on the basis of the calculated likelihood, and the branch judgment section increasing the likelihood of the lane boundary line candidate when a measured curvature of the lane boundary line candidate monotonically varies in the predetermined number of the image frames.

8. The lane boundary line recognition device according to claim 7, wherein the branch judgment section increases the likelihood of the lane boundary line candidate when a radius of the measured curvature of the lane boundary line candidate monotonically varies in the predetermined number of the image frames.

* * * * *